May 13, 1924.  
L. M. MALCHER  
1,494,003
PROCESS OF ATTACKING COMPACT MINERAL MATERIAL, NONCOMBUSTIBLE IN OXYGEN
Filed Aug. 3, 1922
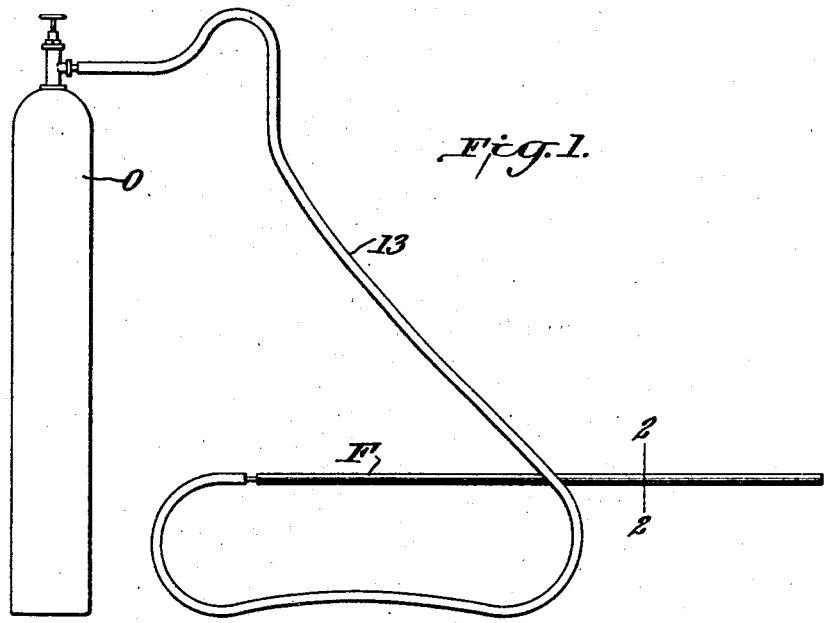
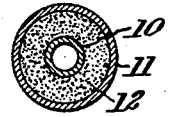
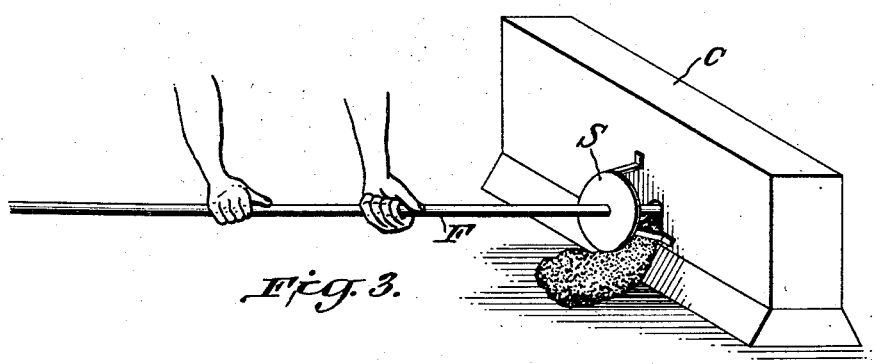
Inventor:  
Leo M. Malcher,  
by Byrnes, Townsend & Brickenstein  
Attorneys.

Patented May 13, 1924.

1,494,003

UNITED STATES PATENT OFFICE.

LEO M. MALCHER, OF CHICAGO, ILLINOIS, ASSIGNOR TO OXWELD ACETYLENE COMPANY, A CORPORATION OF WEST VIRGINIA.

PROCESS OF ATTACKING COMPACT MINERAL MATERIAL, NONCOMBUSTIBLE IN OXYGEN.

Application filed August 3, 1922. Serial No. 579,504.

*To all whom it may concern:*

Be it known that I, LEO M. MALCHER, a citizen of the United States, residing at Chicago, in the county of Cook and State of Illinois, have invented certain new and useful Improvements in Processes of Attacking Compact Mineral Material, Noncombustible in Oxygen, of which the following is a specification.

This invention is a process for piercing or cutting compact mineral materials which are non-combustible in oxygen, and for producing cavities or grooves in such material, or otherwise disintegrating it. Examples of the materials referred to are the solid, compact, non-carbonaceous minerals, and such artificial stone-like materials as brick, cement, concrete, plaster, mortar and stucco.

The piercing or cutting of such materials when it becomes necessary in quarrying, excavating, razing structures and building operations, is commonly effected by drilling, sawing, chiseling or like mechanical operations. These processes are slow, and therefore expensive. Under some conditions they become exceedingly laborious, as when the material operated on is very hard rock or concrete reinforced with iron. Under other conditions, as when operating on furnace linings or other materials which have a high temperature, the edge of any mechanical cutting device is destroyed by the heat, and mechanical cutting becomes practically impossible.

The object of my invention is to provide a method whereby hard compact substances of the kind described may be more readily pierced, cut, or otherwise disintegrated.

This object is accomplished by causing a suitable disintegrating flux to act upon the material at the point where it is desired to attack it, removing the spent flux and the product of its reaction on the material, supplying fresh flux to attack the surface of the material thus exposed, and keeping the flux heated to a temperature where it actively attacks the material. Mechanical means may in some cases be used in conjunction with the chemical disintegration referred to.

A specific example in accordance with my invention will now be described in connection with the accompanying drawing, wherein—

Fig. 1 is a view of the member providing the flux and the fuel for fusing it, and an oxygen container for supplying oxygen to burn the fuel;

Fig. 2 is an enlarged transverse section of the fuel and flux member F along line 2—2 of Fig. 1; and Fig. 3 is a perspective view of the apparatus as used in perforating a pier of concrete.

The fuel employed in the example to be described is metallic iron, and is arranged in the form of two concentric pipes, 10 and 11. In the annular passage between the pipes is placed the powdered flux 12, which may be composed of sodium carbonate borax, and common salt in equal proportions. The inner pipe 10 is connected by a flexible tube 13 with an oxygen cylinder O, in such fashion that oxygen may be delivered through the inner passage without displacing the flux.

The process is carried out as follows: The ends of the pipes 10 and 11 remote from the tube 13 are first brought to their ignition temperature in oxygen by means of an ordinary acetylene torch, a slow stream of oxygen being maintained through the inner pipe 10 during such heating. When one or both of the iron pipes ignite, the member F is placed against the concrete pier C at the point where the perforation is desired, and the supply of oxygen is increased to a quantity sufficient to sustain vigorous combustion.

The burning of the iron liberates a large quantity of heat, while the liquid iron oxid produced attacks the concrete and decomposes it. As the pipes burn off, the flux is liberated and also attacks the concrete. The molten products of the reaction flow from the hole and fresh concrete is thus exposed to the action of the decomposing agents. The member F is fed forward and kept with its extremity at the bottom of the hole until the desired depth is attained or the pier is perforated. The shield S protects the operator from any molten material which may be projected violently from the hole.

Under some conditions it will be desirable to use a single pipe instead of two concentric pipes, and to introduce a fluxing agent, with or without a fuel, into the pipe in such fashion that the stream of oxygen or other gas will carry the added material forward to the reaction zone. Any suitable apparatus may be employed for this purpose, for example that shown in the patent to Harrison, 968,350 dated Aug. 23, 1910.

The invention gives particularly advantageous results when applied to members reinforced with metal rods, wire or the like, such as reinforced concrete. Such reinforcements, if large, are an almost insurmountable obstacle to attack by mechanical means, but present no difficulties when the process of my invention is followed. Under many conditions, the reinforcing members actually assist in the cutting operation, as they can be burned in oxygen and thereby destroyed, and their burning produces a material which strongly attacks the non-metallic material which encases them. The heat due to their combustion and the material formed thereby are both produced at the point where they will exert their maximum effects.

The process lends itself to a wide variety of applications and may be modified in numerous ways, for example with respect to the composition of the flux, the manner of heating it, the manner of supplying the flux to the material under attack, and the manner of removing the reaction products during the course of the operation. It will be understood that the composition of the flux will be so related to that of the material operated on that decomposition of the latter will proceed at a maximum rate with the formation of a product adapted by its fluidity and other properties to be removed readily from the reaction zone. Silicious materials will require basic fluxes while calcareous materials will require acidic fluxes, the choice of the flux depending upon considerations similar to those followed in smelting processes.

Heating may be effected with the blowtorch, using acetylene or other gaseous fuel, or heat produced by the electric arc or developed in an electrical resistance may be employed. The combustion of a solid fuel, such as coal dust, comminuted metal or metal in coherent form, as in the specific example described, in air or oxygen, can also be made to supply the requisite heat. Any combination of these methods of heating may be used.

In the specific example described, the agents which chemically attack the material operated on fall into two classes. The iron oxid is formed at the expense of oxygen consumed during the process, while the alkaline fluxes mentioned absorb no oxygen, being introduced into the process in a form wherein they are able to attack the material immediately and without preliminary oxidation. As used in the claims, the term "preformed flux" is restricted to the latter class of agents, which require no preliminary oxidation to develop their disintegrating properties.

The invention is in no way restricted by any specific compositions, proportions, or arrangements of parts described herein, but is limited only by the appended claims.

I claim:

1. Process of attacking a localized area of compact mineral material which comprises feeding to such area a preformed flux capable of decomposing the material at an elevated temperature, and flowing away from the region the products of the reaction between the flux and said material.

2. Process of attacking compact mineral material which comprises establishing a localized reaction zone wherein the material is in contact with a preformed decomposing flux, flowing away the decomposition product, and supplying additional preformed flux to the undecomposed material thus exposed.

3. Process of attacking a localized area of compact mineral material which comprises feeding to such area a preformed flux capable of decomposing the material at an elevated temperature, heating the flux by the combustion of a metal which forms an oxid capable of decomposing said mineral material, and flowing away from the region of attack the decomposition product of said mineral material.

4. Process according to claim 3 wherein the preformed flux comprises a compound of an alkali metal.

5. Process according to claim 3 wherein the preformed flux comprises sodium carbonate.

6. Process according to claim 3 wherein the metal burned for heating the preformed flux is iron.

7. Process according to claim 3 wherein oxygen in concentrated form is supplied to burn the metal used for heating the preformed flux.

8. Process of attacking compact mineral material which comprises establishing a localized reaction zone wherein the material is in contact with a preformed decomposing flux, supplying heat to the reaction zone by the oxidation of a metal, flowing away the decomposition product of the mineral material, and supplying additional preformed flux to the undecomposed material thus exposed.

9. Process of perforating concrete which comprises burning iron pipe in oxygen in contact with the concrete, feeding preformed fluxing material to the point of contact, and feeding the iron pipe forward as it is consumed and the concrete is fluxed away.

10. Process of perforating reinforced concrete which comprises advancing a highly heated region through the concrete, supplying oxygen to said region to consume the reinforcement and supplying preformed flux to said region to decompose the concrete.

In testimony whereof I affix my signature.

LEO M. MALCHER.